Figure 1:
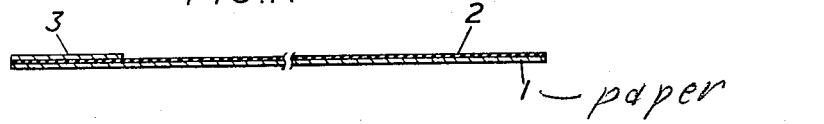

March 26, 1957     R. C. ROSS ET AL     2,786,622

MULTI-PLY PAPER SACKS

Filed Oct. 12, 1954 polyethylene
paper

INVENTORS
RUPERT CUMINE ROSS
NORMAN PETER SMITH
WILLIAM ROBERT SPENCE
BY *Bacon & Thomas*
Attorneys

2,786,622

MULTI-PLY PAPER SACKS

Rupert C. Ross, Loose, near Maidstone, Norman P. Smith, Aylesford, near Maidstone, and William R. Spence, Ascot, England, assignors to Medway Paper Sacks Limited, London, England, a British company Application October 12, 1954, Serial No. 461,824

Claims priority, application Great Britain October 13, 1953

4 Claims. (Cl. 229—55)

This invention is concerned with improvements in or relating to multi ply paper sacks and is more particularly concerned with such sacks having one ply, generally but not necessarily, the innermost ply which consists of paper coated with a thin film of a thermoplastic substance such for instance as polyethylene.

Such sacks are used for various chemical substances and foodstuffs where it is of importance that moisture should be as far as possible completely excluded from the sack.

The manufacture of multi ply paper sacks is carried out at high speed on tubing machines and when using a ply of paper coated with thermoplastic it is a matter of considerable difficulty to obtain a satisfactory moisture proof seal along the sides of the tube formed in the tubing machines. This difficulty arises from the fact that the thermoplastic substance does not readily adhere to paper except when it is in a substantially molten state and this molten state cannot readily be achieved when the material is being worked up on high speed paper tubing machines.

It has been proposed to make such multi-ply paper sacks by using special adhesives having a rubber base for the joint between the thermoplastic substance and paper which overlay one another when the tube is formed. These adhesives are however costly and not readily available in commercial quantities in this country. Some of them furthermore have an odour which might be objectionable in contact with certain foodstuffs, and they tend after a certain time to perish.

It has also been suggested that moisture proof sacks might be made with a composite innermost ply consisting of kraft paper, thermoplastic substance and kraft paper. This composite ply would be formed into a tube and the sides would be adhered together by any suitable adhesive since there would be a paper to paper joint. A disadvantage of such a sack would be that since the composite ply consists of two complete plies of kraft paper with a thermoplastic layer adhering to each of them, the difficulty of obtaining a satisfactory coating with the thermoplastic substance is considerable and the resultant composite ply is comparatively heavy and would be difficult to handle and furthermore would involve an unnecessarily high use of kraft paper. Furthermore when such a composite ply was being used in a sack to contain fertilizers or other substances with a high percentage of acid or which were liable to give off acid gas the paper layer in contact with the contents tends to disintegrate and peel away from the remainder of the composite ply thus becoming mixed with the contents. Again where granular material is to be packed in such sacks the abrasive action of the material on the paper layer again tends to cause the paper to disintegrate and contaminate the contents of the sack.

It is already known to provide multi ply paper sacks in which the innermost ply is of kraft paper coated with a thermoplastic substance, the substance being so applied that there is an uncoated marginal strip left along one edge of the kraft paper. When the tube is formed to produce the bag the uncoated paper marginal strip is lapped over onto the opposite edge of kraft paper and stuck to it with adhesive. The joint is again a paper to paper joint but it has been found that there is a marked tendency for moisture to be absorbed at this joint which functions somewhat as a wick and allows moisture to pass through the uncoated paper marginal strip to the contents of the sack.

It is an object of the present invention to provide an improved multi ply paper sack having at least one ply consisting of kraft paper coated with a thermoplastic substance which overcomes the abovementioned difficulties and disadvantages and enables such sacks to be produced on the usual high speed tubing machines.

According to the present invention therefore, we provide a multi ply paper sack having at least one ply consisting of paper coated with a thermoplastic substance such for example as polyethylene characterised in that said ply has along at least one of the two edges which overlap to form the side seam of the sack a marginal strip of paper superposed on the thermoplastic coating which strip serves to provide a paper to paper joint for the side seam of that ply whilst simultaneously providing a double thickness of thermoplastic substance at said side seam as a moisture resistant barrier.

We have found that with a paper to paper side seam adhered together by a suitable water resistant adhesive and with a double thickness of the thermoplastic coating at the side seam a considerable improvement in the moisture repellant properties of the sack can be obtained, whilst at the same time the sacks can be made in the normal way on high speed tubing machines.

The said paper ply coated with thermoplastic is preferably kraft paper although we may employ crepe paper. Similarly the other plies of the multi ply sacks according to this invention may be of crepe, kraft or any other suitable paper.

The said marginal strip of paper may be provided on one or both of the edges of the ply of paper which will form the side seam, although it is usually only necessary to have such strip on one side. The width of the said marginal strip will vary according to the size of the sack to be made and the amount of overlap needed for the side seam, in general a width of marginal strip and overlap of about 1" will be sufficient.

The coating of the paper ply with the thermoplastic substance is carried out by methods known per se and similar methods may be employed for causing the marginal strip to be superposed on and adhered to the thermoplastic coating along the margin. Such marginal strip may be provided by a separate strip of kraft or other, e. g. crepe paper, of the desired width which is applied to the edge of a paper ply wholly coated with the thermoplastic substance, or it may be provided by so coating a paper ply with the thermoplastic substance that an uncoated marginal strip of the desired width is left along one or both edges. Such marginal strip is then folded over on to the thermoplastic coating and adhered thereto thus again producing an edge to form half of the side seam which edge consists in effect of a sandwich of thermoplastic substance between two layers of paper.

It will be appreciated that sacks made according to this invention may have any desired number of plies. The ply coated with the thermoplastic substance will in general be the innermost ply. The thermoplastic coating may be arranged to be on the inside or outside of the coated ply as required and the formation of the side seam by the overlap of two edges will be appropriately arranged to ensure that there is always a paper to paper joint with one layer of thermoplastic substance on the outside of the joint and another layer on the inside thereof.

Figure 2:
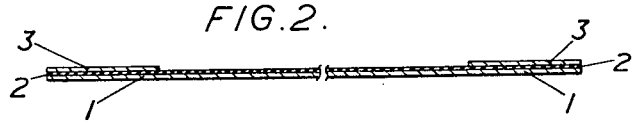
Figure 3:
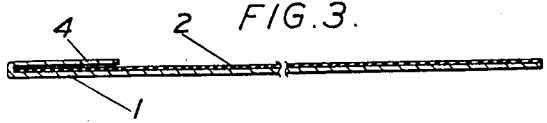
Figure 5:
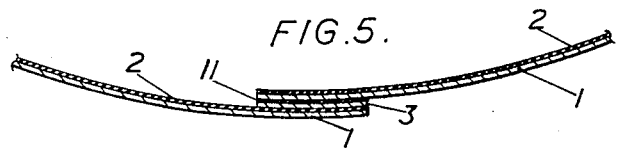
Figure 4:
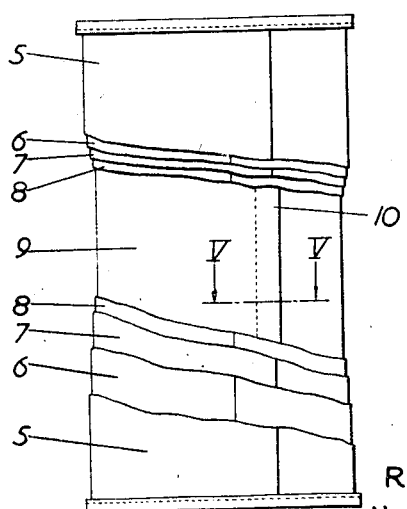

In order that the invention may be well understood some preferred embodiments thereof will now be described by way of example only with reference to the accompanying drawings in which:

Figures 1, 2 and 3 show cross sections on a greatly enlarged scale through three different coated paper plies suitable for the manufacture of multi ply sacks according to this invention, Figure 4 shows a multi ply sack according to the invention in front elevation and Figure 5 is a fragmentary section on the line V—V of Figure 4.

Figure 1 shows a composite ply of paper comprising a web 1 of kraft paper, having a coating 2 of polyethylene applied thereto in a manner known per se. As will be seen the coating 2 extends across the whole width of web 1. Along one longitudinal marginal edge of the coated web 1 a strip 3 of for instance 1" width of kraft paper is applied to the polyethylene coating 2 and caused to adhere thereto in a similar known manner.

In Figure 2 a similar composite ply is shown the paper web 1 however having a marginal strip of paper 3 extending along both of its longitudinal edges.

Figure 3 shows a modified construction of composite ply in which the paper web 1 is coated with a polyethylene coating 2 up to a marginal strip 4 which is left uncoated. This strip 4 is then folded over onto the coating 2 and caused to adhere thereto thus again providing a composite ply having along one longitudinal edge a marginal strip of paper superposed on the polyethylene coating 2.

Figure 4 shows by way of example only a five ply paper sack in which plies 5, 6, 7 and 8 which consist of either crepe or kraft paper as desired are shown broken away to reveal the innermost ply 9 which is made of a composite ply as shown in Figure 1. As will be seen from Figure 5 the composite ply 9 is formed into a sack tube with the polyethylene coating 2 on the inside and the two edges of the ply are overlapped and stuck together to form a side seam 10 by any suitable water resistant adhesive layer 11. An example of such an adhesive is dextrin glue having its pH value adjusted and incorporating a synthetic resin such as urea formaldehyde, which is a known air-drying adhesive. Since the paper strip 3 has only to adhere to the outer paper web 1 any water resistant adhesive normally used in the pasting of sack tubes on high speed machines may be used. There is however, a marginal overlapping portion of polyethylene on each side of the adhesive joint to serve as a moisture repellant barrier.

It will be appreciated that multi ply sacks similar to that shown in Figure 5 may be made with their coated ply formed from a composite ply as shown in either Figure 2 or 3 since in each case the side seam will consist of a paper to paper joint with two overlapping strips of polyethylene as a moisture repellant barrier.

We prefer to form sacks according to this invention with sewn closures at each end, such bottom closures being of a type known per se. In order to obtain the maximum moisture repellant properties at the end, the bottoms of the sacks may be wax dipped. It will be understood however, that it is within the scope of the invention to provide sacks with end closures other than sewn closures, thus they may be closed for instance by means of staples or may be secured by adhesives, suitable means known per se being provided to exclude moisture from the end closures. We may also provide sacks according to this invention with block bottom end closures with or without valves, suitable known means again being provided for the exclusion of moisture at the closures and valve.

It will be understood that we have only described some preferred embodiments by way of example of sacks according to this invention and that variations and modifications may be made therein without departing from the scope of the invention. Thus whilst we prefer to have a coated ply coated with polyethylene other thermoplastic coatings may be employed. Furthermore the coated ply having a sealed side seam according to this invention may be incorporated into any of the known types or constructions of multi ply sack.

We claim:

1. An article forming one ply of a multi-ply paper sack, comprising: a paper sheet coated on one side only with a layer of thermoplastic water-proofing substance and having opposed longitudinal edges and a paper strip secured to said thermoplastic substance along at least one of said longitudinal edges, said strip being secured by an air-drying, water-resistant adhesive to the uncoated side of said paper sheet along its opposite longitudinal edge to form a tubular construction having a flat longitudinal seam with a paper-to-paper joint, said ply at the seam thus incorporating two overlapping portions of the layer of the thermoplastic substance separated by two thicknesses of paper.

2. The article of claim 1 wherein the water-proofing substance comprises polyethylene.

3. The article of claim 1 wherein said paper strip is integral with said paper sheet and is folded over and adhered to the coated side thereof.

4. A multi-ply paper sack as defined in claim 1 wherein said paper sheet comprises the innermost ply of said sack and wherein said thermoplastic substance is disposed on the inside of said innermost ply.

References Cited in the file of this patent

UNITED STATES PATENTS

| 2,162,258 | Hultin | June 13, 1939 |
| 2,201,416 | Wagner | May 21, 1940 |
| 2,220,873 | Waters | Nov. 5, 1940 |